(12) United States Patent
Mazet et al.

(10) Patent No.: US 8,937,912 B2
(45) Date of Patent: Jan. 20, 2015

(54) SYSTEM AND METHOD USING MULTIPLE REQUEST TO SEND (RTS) MESSAGES TO ENHANCE WIRELESS COMMUNICATION RESOURCE ALLOCATION

(75) Inventors: Laurent S Mazet, Paris (FR); Sophie Gault, Paris (FR); Mohamed Kamoun, Palaiseau (FR)

(73) Assignee: Google Technology Holdings LLC, Mountain View, CA (US)

( * ) Notice: Subject to any disclaimer, the term of this patent is extended or adjusted under 35 U.S.C. 154(b) by 831 days.

(21) Appl. No.: 12/508,286

(22) Filed: Jul. 23, 2009

(65) Prior Publication Data

US 2010/0027490 A1 Feb. 4, 2010

(30) Foreign Application Priority Data

Jul. 31, 2008 (EP) ..................................... 08290738

(51) Int. Cl.
*H04W 4/00* (2009.01)
*H04W 74/08* (2009.01)
*H04W 72/04* (2009.01)
*H04W 74/00* (2009.01)
*H04W 84/12* (2009.01)

(52) U.S. Cl.
CPC .......... *H04W 74/0816* (2013.01); *H04W 72/04* (2013.01); *H04W 74/004* (2013.01); *H04W 74/006* (2013.01); *H04W 84/12* (2013.01)
USPC ....................................................... 370/329

(58) Field of Classification Search
None
See application file for complete search history.

(56) References Cited

U.S. PATENT DOCUMENTS

| 6,967,937 | B1 * | 11/2005 | Gormley ........................ 370/330 |
| 2003/0210680 | A1 * | 11/2003 | Rao et al. ....................... 370/352 |
| 2004/0137906 | A1 * | 7/2004 | Nakao et al. ................... 455/450 |
| 2006/0056340 | A1 | 3/2006 | Hottinen et al. |
| 2007/0133457 | A1 * | 6/2007 | Doi et al. ....................... 370/329 |

OTHER PUBLICATIONS

Sheng Zhou et al., "An Uplink Medium Access Protocol with SDMA Support for Multiple-Antenna WLANs", Mar. 31, 2008, Wireless Communications and Networking Conference, 2008. WCNC 2008. IEEE, pp. 1809-1814, XP031243907 ISBN: 978-1-4244-1997-5 10.1109/WCNC.2008.322.*

Gross et al., "Dynamic multiuser-ofdm for 802.11 systems," Contribution to IEEE 802.11vht SG 11-07/2062r1, Technical University Berlin (2007).

(Continued)

*Primary Examiner* — Ian N Moore
*Assistant Examiner* — Brian T Le
(74) *Attorney, Agent, or Firm* — Lerner, David, Littenberg, Krumholz & Mentlik, LLP

(57) ABSTRACT

A system and method using multiple request to send (RTS) messages to enhance wireless communication resource allocation. The system and method operates a receiver to receive an RTS message from a station operating in, for example, a very high throughput wireless local area network, and in response, to transmit an ask for request (AFR) message. The receiver can receive multiple RTS messages and in response, issue respective AFR messages, to thus perform RTS negotiation of resources for access by the stations. If the receiver fails to receive any further RTS messages due to, for example, collision of RTS messages sent by multiple stations or failure of any other stations to send an RTS message, the receiver can then issue a clear to send (CTS) message indicating to all stations that have sent an RTS message that they are clear to send to the receiver using the information contained in the AFR message.

16 Claims, 4 Drawing Sheets

(56) References Cited

OTHER PUBLICATIONS

Park et al., "SPACE-MAC: Enabling spatial reuse using MIMO channel-aware MAC," Proceedings of the IEEE International Conference on Communications, vol. 5, pp. 3642-3646, Seoul, Korea (2005).

I. Telatar, "Capacity of Multi-antenna Gaussian Channels," Technical report, AT & T Bell Labs (1995).

EPC Extended Search Report, Re: Application #08290738.7-1249; Jan. 21, 2009.

Sheng Zhou, et al, "MAC 18-2—An Uplink Medium Access Protocol with SDMA Support for Multiple-Antenna WLANs" Wireless Communications and Networking Conference, Mar. 31, 2008, pp. 1809-1814.

Peng Xuan Zheng, et al, "Multipacket Reception in Wireless Local Area Networks", Communications, 2006. ICC '06. IEEE International, Jun. 1, 2006.

* cited by examiner

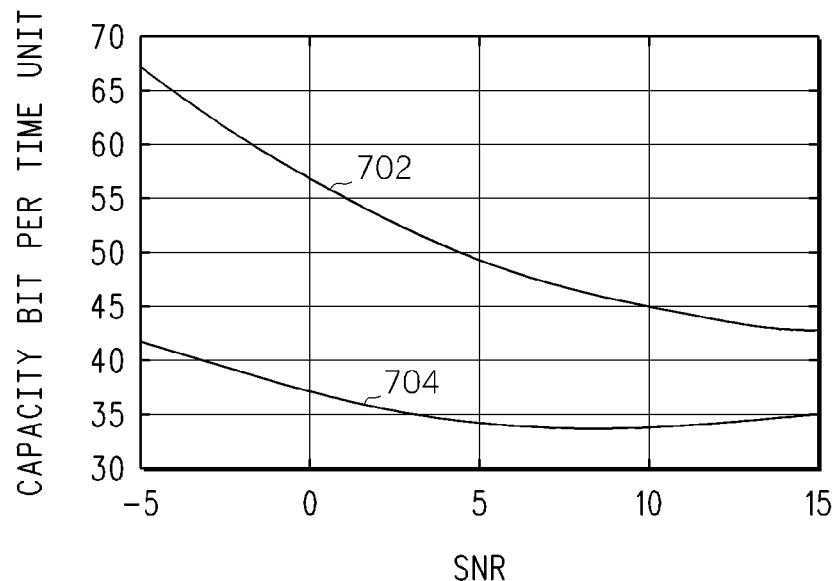
FIG. 7
FIG. 8
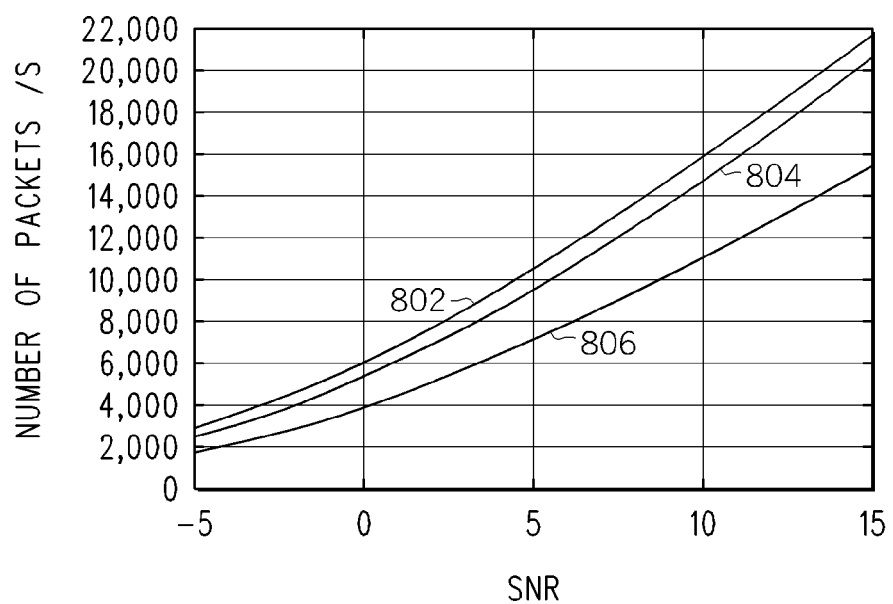

SYSTEM AND METHOD USING MULTIPLE REQUEST TO SEND (RTS) MESSAGES TO ENHANCE WIRELESS COMMUNICATION RESOURCE ALLOCATION

FIELD OF THE INVENTION

The present invention relates generally to enhancing resource allocation in wireless communications systems. More particularly, the present invention relates to a system and method using multiple request to send (RTS) messages to enhance wireless communication resource allocation.

BACKGROUND

Currently, standards for a very high throughput Wireless Local Area Network (WLAN) are under consideration for inclusion in the IEEE Standard 802.11 VHT (very high throughput) Standard. One major difference between the type of WLAN being considered for standardization and other IEEE Standard 802.11x PHY (physical) layer architectures, such as those in IEEE Standard 802.11(n), is the introduction of Spatial Division Multiple Access (SDMA) and Orthogonal Frequency Division Multiple Access (OFDMA) in the WLAN communications.

As understood by one skilled in the art, SDMA and OFDMA can potentially create communication resource shortages. Therefore, a need exists for algorithms and mechanisms which allow for concurrent access of the same bandwidth by different users. However, the CSMA scheme, which is used in IEEE Standard 802.11x systems, does not provide a natural way for multiple users to share a common time slot. Hence, the current CSMA scheme is generally viewed as unsuitable for use in a VHT WLAN.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

FIG. 7 is a graph illustrating an example of the relationship between the gain of an SDMA-based multiple RTS mechanism according to an embodiment of the present invention versus the gain of a standard RTS-CTS mechanism; and FIG. 8 is a graph illustrating an example of the relationship between the number of packets transmitted per second depending on the number of users of he network shown in FIG. 1, verses signal to noise ratio.

Figure 1:
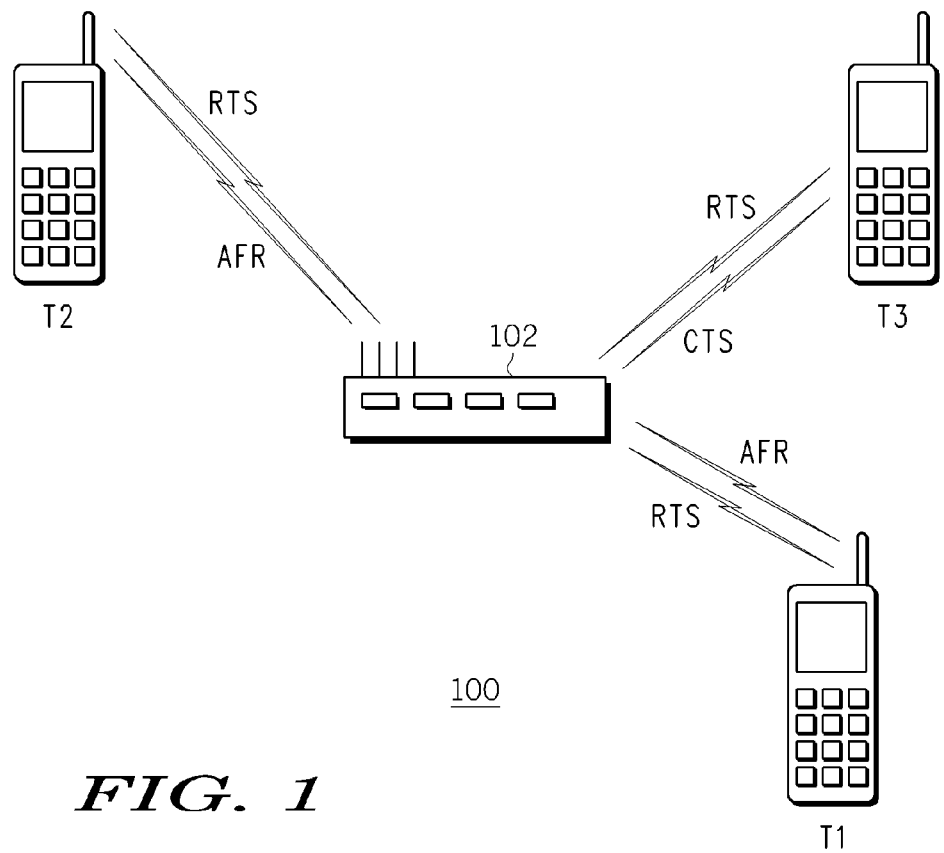
FIG. 1 is a block diagram illustrating an example of a wireless communications network using CSMA/CA for communication.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to a system and method using multiple request to send (RTS) messages to enhance wireless communication resource allocation. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of a system using multiple request to send (RTS) messages to enhance wireless communication resource allocation described herein. The non-processor circuits may include, but are not limited to, a radio receiver, a radio transmitter, signal drivers, clock circuits, power source circuits, and user input devices. As such, these functions may be interpreted as steps of a method using multiple request to send (RTS) messages to enhance wireless communication resource allocation. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

FIG. 1 is a block diagram illustrating an example of a wireless communications network 100 using CSMA/CA for communication. As shown, the network 100 includes a receiver 102, such as a wireless router or a base station, and a plurality of stations (e.g., user terminals) T1, T2 and T3. As can be appreciated by one skilled in the art, the receiver 102 and the stations T1, T2 and T3 each include one or more processors, one or more transceivers, and the associated hardware and software that enables the stations T1, T2 and T3 to wirelessly communicate information (e.g., data, voice or multimedia) in the form of packets or frames with the receiver 102 and vice-versa.

As can be appreciated by one skilled in the art, in typical CSMA/CA, when a device, such as a station T1, wishes to communicate a frame or packet of information to a receiver 102, the station T1 will send a request to send (RTS) message that can be received by the wireless router 102. If the wireless router 102 is clear to receive a frame, the receiver 102 will issue a clear to send (CTS) message. Upon receiving the CTS message, the station T1 will then transmit a frame for receipt by the receiver 102.

Figure 2:
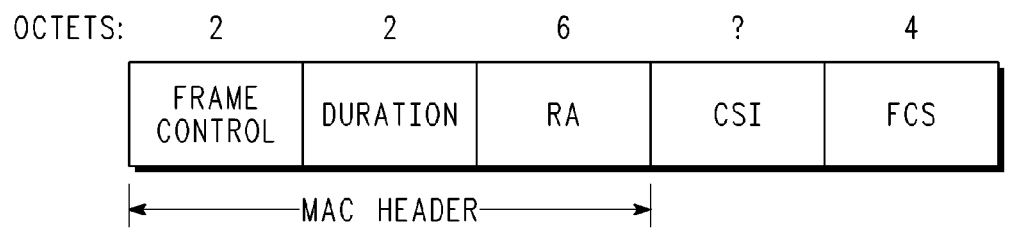
FIG. 2 is an example of an Ask For Requests (AFR) frame format used in the communications network of FIG. 1.

In this example, however, after having received an RTS message from a station (e.g., first station T1), the receiver 102 sends a management frame, that is, an "Ask For Request" (AFR) frame, that includes information elements about the manner in which station T1 will need to send frames to the receiver 102. An example of a format for an AFR frame 200 is shown in FIG. 2. In this example, the AFR frame 200 includes a media access control (MAC) header including 2 octets containing frame control information, 2 octets containing information about the duration of the frame, and 6 octets including the receiver address (RA). The AFR frame 200 in this example further includes an undefined number of octets containing the channel state information (CSI) which is described in more detail below, and 4 octets including frame check sequence (FCS) information.

Figure 3:
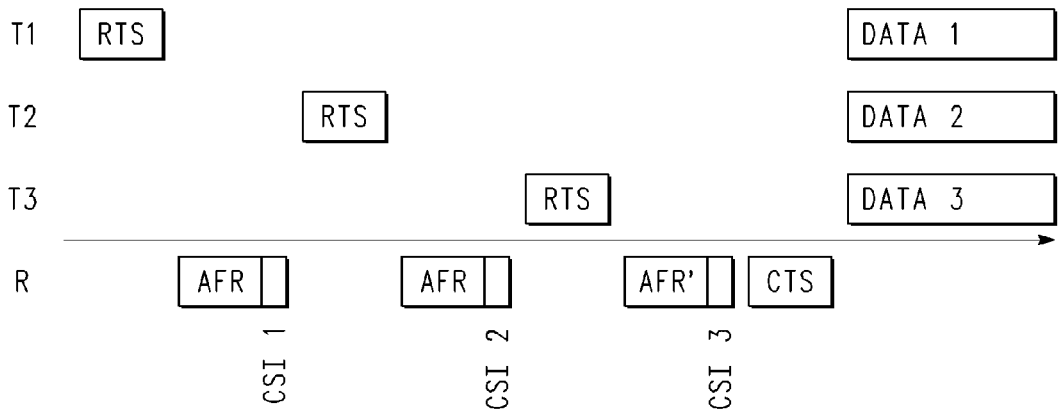
FIG. 3 is a timing diagram illustrating an example of a full multiple Request to Send (RTS) mechanism used in accordance with an embodiment of the present invention.

FIG. 3 is a timing diagram illustrating an example of the transmission of RTS messages by stations T1, T2 and T3 at different times, and the subsequent AFR frames transmitted by receiver 102 in response to the RTS messages for receipt by the stations T1, T2 and T3. In this example, the AFR frame sent by receiver 102 in response to an RTS message received from station T1 includes CSI information identified as CSI1. Similarly, the AFR messages sent by receiver 102 in response to RTS messages received from stations T2 and T3 include CSI information identified as CSI2 and CSI3, respectively.

As can be appreciated by one skilled in the art, the CSI may be different if the multiple RTS mechanism is used in an OFDMA sharing context or an open/closed loop SDMA sharing context. That is, for OFDMA, the CSI1 sent will represent the groups of carriers allocated to T1. On the contrary, for closed loop SDMA, CSI1 will contain the precoding matrix, and for open loop SDMA, CSI1 will describe the spatial division multiplexing/space time block coding (SDM/STBC) scheme.

Accordingly, the receiver 102 can act as a scheduler which optimizes the resource allocation between multiple users (multiple stations T1, T2 and T3). However, the scheduling in this arrangement can at times be less than optimal because the receiver 102 allocates resources in a successive fashion, to one user after another.

The receiver 102 can also initiate a multiple RTS negotiation because the receiver 102 recognizes that there are several VHT devices (e.g., stations T2 and T3) which may need to often access a particular channel. By sharing the medium, those stations will have the opportunity to send data to the receiver 102 and enhance their quality of service (QoS).

Furthermore, stations T2 and T3 are generally aware of the channel conditions between themselves and the receiver 102. However, because those other stations T2 and T3 may also receive the AFR containing CSI1 that was transmitted by the receiver 102 for receipt by station T1, those other stations T2 and T3 receive information about the way station T1 will use the communication medium. In view of that information, the other stations T2 and T3 can evaluate their achievable throughput using the remaining resources.

For example, if one other station (e.g., station T2) is comfortable with what resources are still available, that station T2 can request to send data on the sharing medium by sending an RTS. The receiver 102 will answer by sending another AFR containing CSI2 that informs the station T2 of the part of the medium that is dedicated to station T2.

It should also be noted that some terminals may not contend for the remaining resources because, for example, the estimated expected throughput is not sufficient. In this event, the collision probability decreases during the second RTS competition.

The process is iterated as long as some resources to share remain. If there are no more resources available, that is, after the last resources have been allocated, the receiver sends a last AFR validating the insertion of the last requester (e.g., station T3) followed by a global CTS. This CTS is understandable by all types of devices (e.g., VHT or legacy devices) and will help non-sending devices set their Network Allocation Vector (NAV), and further will synchronize all the sending devices (stations) before they start transmitting.

Figure 4:
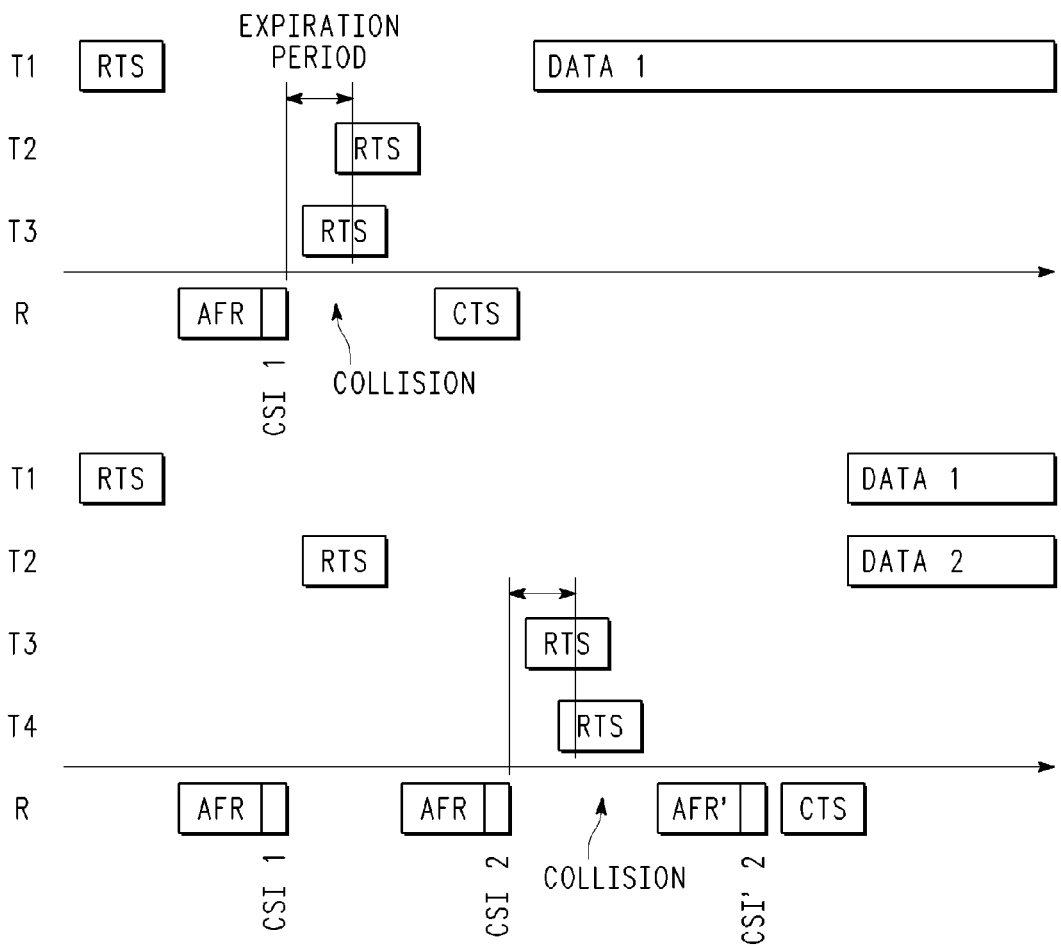
FIG. 4 is a timing diagram illustrating an example of a multiple RTS mechanism in accordance with an embodiment of the present invention when collisions occur between frames.

It should also be noted that as shown in FIG. 4, after the receiver 102 has sent an AFR, a contention window is implemented to reduce the collision probability. In this event, it can be more efficient to use the time granularity of an OFDM symbol and reduce the window length to limit the multiple RTS-CTS overhead penalty.

Figure 5:
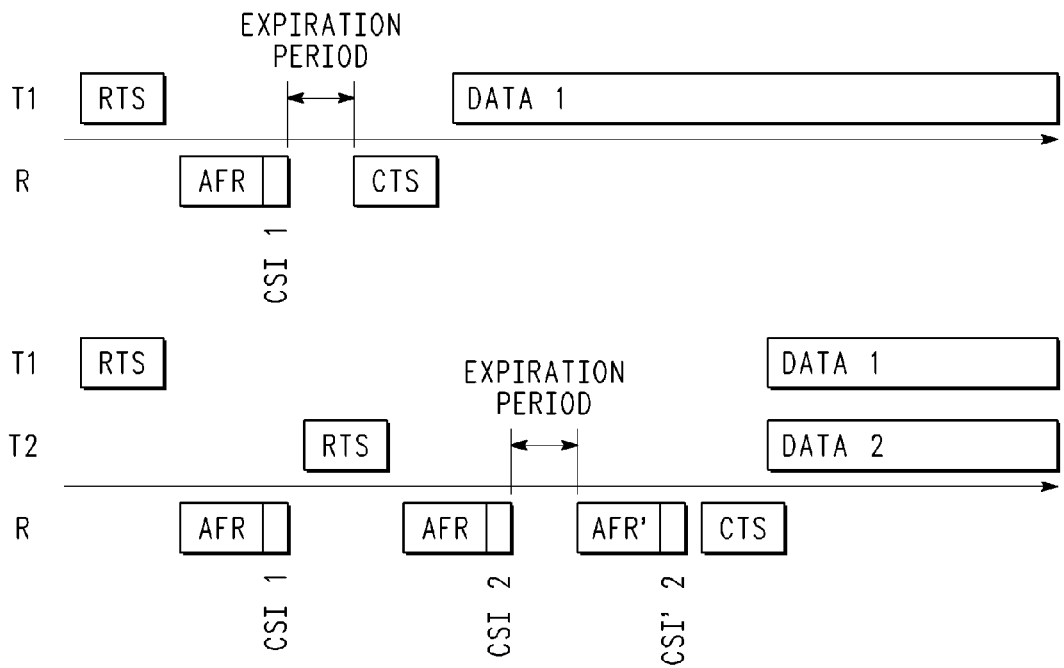
FIG. 5 is a timing diagram illustrating an example of a multiple RTS mechanism in accordance with an embodiment of the present invention when no further RTS is received by the receiver during the expiration period.

If a collision occurs during this period of time as shown in FIG. 4, or if the receiver 102 did not receive any other RTS as shown in FIG. 5, the receiver 102 may send a CTS closing the multiple RTS negotiation period and possibly reallocate some extra resources to the last requesting station. The reallocation is achieved by transmitting another AFR' containing CSI'2 directed to the last requesting station (e.g., station T2) before transmitting the CTS. CSI'2 contains information pertaining to the resources that are now available for use by the last requesting station (e.g., station T2). This mechanism will limit the loss impact due to an unsuccessful negotiation period. For example, if after the first AFR is sent, there is a collision as shown in the top timing diagram of FIG. 4, or no other RTS is received during an expiration period as shown in the top timing diagram of FIG. 5, the receiver 102 transmits a CTS. By doing this, the receiver 102 in effect cancels the negotiation and returns to the standard RTS/CTS mechanism as understood by one skilled in the art.

On the other hand, after the negotiation period has occurred between the receiver 102 and, for example, station T1, all other stations T2 and T3 have enough knowledge to determine the maximum length of the transmission that they can perform. Therefore, after sending their own data frame, transmitting stations will wait until the end of the longest data frame transmission to listen for a multiple acknowledgment packet from the receiver 102. Other stations, which do not participate to the transmission, can switch off to preserve their battery life or conserve energy, and they will wake up after the multiple acknowledgment packet (frame) transmission.

It should also be noted that during negotiation for OFDMA access, legacy devices have seen many duration fields from the RTSs but also from the last CTS. Because multiple devices share the medium at the same time, the duration announced in the first RTS is typically shorter than how long the transmission will last. However, this duration will be enough to shut off legacy devices during the negotiation. The control frame which announces the correct duration is the last CTS.

The process described above assumes a loaded network where each user (station) has a packet of data to send. The improvement of the multiple RTS mechanism is calculated in an SDMA context where 2 or 3 users are allowed to transmit at the same or substantially the same time. The comparison is based on capacity in bit per OFDM symbol. Some notations are introduced before the calculation of these capacities, as identified in Table 1.

TABLE 1

Useful parameters involved in multiple RTS mechanism.

| | |
|---|---|
| $P_s$ | packet duration |
| $t_{AIBP}$ | average backoff duration which comes before a successful RTS |
| $t_{AFR}$ | duration of an AFR |
| $t_{BP}$ | contention window size for other RTS (2nd, 3rd . . . ) |
| $t_{CTS}$ | duration of a CTS |
| $t_{IBP}$ | contention window size for the first RTS |
| $t_{RTS}$ | duration of an RTS |

All durations are expressed in OFDM symbol duration. For a contention window size of n and K users, the average successful backoff period is denoted by $t_{AB}(n, K)$ and the collision probability is denoted by $p_c(n, K)$. These variables are given by equations (1) and (2), respectively.

$$t_{AB}(n, K) = \sum_{i=0}^{n-1} \frac{(n-i-1)^{(K-1)}}{\sum_{j=0}^{n-1}(n-j-1)^{(K-1)}} i \quad (1)$$

$$p_c(n, K) = \sum_{i=0}^{n-1}\sum_{j=2}^{K} \binom{K}{j}\frac{(n-i-1)^{(K-j)}}{n^K} \quad (2)$$

It should also be noted that in the standard RTS/CTS mechanism, there are two possible events, namely:
1. ($A_1$) Successful Backoff-RTS-CTS: transmission of 1 packet (frame).
2. ($A_2$) Collision: no packet transmission.

The probabilities of ($A_1$) and ($A_2$) are respectively given by $$P(A_1)=1-p_c(t_{IBP}, K)$$

$$P(A_2)=p_c(t_{IBP}, K) \quad (3)$$

The capacity in bit per time unit for classical RTS-CTS mechanism is given by $$C_{mRTS} = \frac{P_c C_{MIMO}(r, t, SNR)}{t_{RTS} + t_{CTS} + P_c} \quad (4)$$

where $C_{MIMO}(r, t, \rho)$ is the ergodic capacity of a multiple-input multiple-output (MIMO) system with r receive antennas and t transmit antennas, with $\rho$ representing the received signal to noise ratio (SNR).

It should further be noted that with two users, there are three possible events:
1. ($E_1$) Successful Backoff-RTS-AFR-RTS-AFR-CTS: this is the best case where two users are granted the channel at the same time.
2. ($E_2$) Successful Backoff-RTS-AFR-COL-CTS: this is the case where the first RTS only is successful and the second RTS is altered by a collision, so that the channel is eventually granted for only one user.
3. ($E_3$)=($A_2$) Collision in the first RTS: this is the worst case where the first RTS is altered by a collision so that no user is granted the channel.

The probabilities of events ($E_1$) ($E_2$) and ($E_3$) are given by the equation:

$$P(E_1)=(1-p_c(t_{IBP}, K))(1-p_c(t_{BP}, K-1))$$

$$P(E_2)=(1-p_c(t_{IBP}, K))p_c(t_{BP}, K-1)$$

$$P(A_2)=p_c(t_{IBP}, K) \quad (5)$$

The capacity in bit per OFDM is given by the equation $$C_{2mRTS} = \frac{P(E_1)C_{MIMO}(r, 2\times t, 2SNR)P_c + P(E_2)C_{MIMO}(r, t, SNR)P_c}{P(E_1)(N2d_1 + P_c) + P(E_2)(N2d_2 + P_c) + P(A_2)(t_{IBP} + t_{RTS})} \quad (6)$$

where $N2d_1$ is the average negotiation period corresponding to event ($E_1$), given by the equation:

$$N2d_1 = t_{AIBP} + 2t_{RTS} + 2t_{AFR} + t_{AB}(B_p, K-1) + t_{CTS} \quad (7)$$

and where $N2d_2$ is the negotiation period corresponding to event ($E_2$), given by the equation:

$$N2d_2 = t_{AIBP} + 2t_{RTS} + t_{AFR} + B_p + t_{CTS} \quad (8)$$

In the same way, when 3 users are allowed to simultaneously transmit, the capacity is given by $$C_{3mRTS} = \frac{P_cP(F_1)C_{MIMO}(r, 3\times t, 3SNR) + P(F_2)C_{MIMO}(r, 2\times t, 2SNR) + P(F_3)C_{MIMO}(r, t, SNR)}{P(F_1)(N3d_1 + P_c) + P(F_2)(N3d_2 + P_c) + P(F_3)(N3d_3 + P_c) + P(A_2)(t_{IBP} + t_{RTS})} \quad (9)$$

where ($F_1$), ($F_2$) and ($F_3$) are the events corresponding to 3 successful RTS, to 2 successful RTS and to only one successful RTS, respectively. $N3d_1$, $N3d_2$ and $N3d_3$ are their corresponding negotiation durations.

The performance of the multiple RTS mechanism can be assessed by simulations. Table 2 below shows the typical sizes of the frames which have been used in those simulations.

TABLE 2

Duration of the frames involved in multiple RTS mechanism

| Frames | Duration in OFDM symbols |
|---|---|
| $t_{RTS}$ | 11 |
| $t_{CTS}$ | 10 |
| $t_{AFR}$ | between 10 and 16 |

For the AFR size, we provide a range since the channel coefficients may be transmitted with variable precision.

Figure 6:
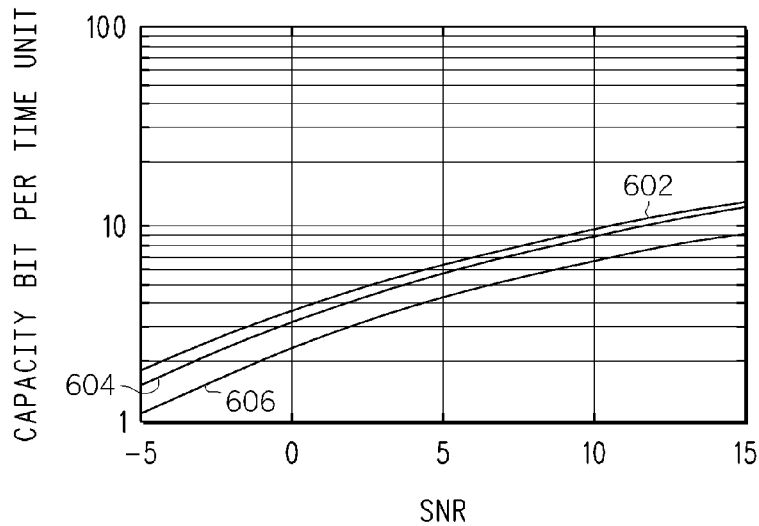
FIG. 6 is a graph illustrating an example of the relationship between capacity per time unit for an SDMA-based multiple RTS mechanism according to an embodiment of the present invention versus that for a standard RTS-CTS mechanism.

FIG. 6 illustrates an example of capacities obtained with classical RTS mechanism and multiple RTS mechanism when 2 and 3 users share the medium. The graph of FIG. 6 depicts capacity of multiple RTS compared to classical RTS with $N_u=10$ and $B_p=20$. Curve 606 depicts classical RTS. Curve 604 depicts multiple RTS with 2 users in accordance with an embodiment. Curve 602 depicts multiple RTS with 3 users in accordance with an embodiment. In spite of the penalty of the overhead required for negotiation, the aggregated capacities are enhanced in the multi-user cases.

Also, the capacity still increases with the number of users simultaneously transmitting, but to a lesser extent. FIG. 7 shows an example of relative gains of multiple RTS compared to the standard RTS-CTS mechanism. Curve 704 depicts an illustrative gain of multiple RTS with two users, according to an embodiment, as a percentage of classical RTS. Curve 702 depicts an illustrative gain of multiple RTS with three users, according to an embodiment, as a percentage of classical RTS. At the cell border (low SNR), an approximately 40% increase can be expected when allowing 2 users to transmit simultaneously, and an approximately 65% increase can be expected when allowing 3 users to transmit simultaneously. However, for mobiles closer to the base station (e.g., receiver 102 as shown in FIG. 1) having high SNR, the capacity increase falls to 35% for 2 users and 45% for 3 users. Greater gains in low SNR region are observed, which demonstrates efficiency in the transmission of long packets using low MCS, which limit the impact of the required overhead.

FIG. 8 shows an example of the packet rate for standard RTS-CTS mechanism compared to the multiple RTS mechanism. The graph of FIG. 8 depicts the performance of multiple RTS, in an embodiment, in number of packets per unit time. Curve 806 depicts an illustrative number of packets per second for classical RTS. Curve 804 depicts an illustrative number of packets per second for for multiple RTS with two users, according to an embodiment. Curve 802 depicts an illustrative number of packets per second for for multiple RTS with three users, according to an embodiment. It can be seen that an embodiment of the multiple RTS system can transmit a higher number of packets per second, and can thus serve more users by reducing the mean delay to transmit a packet, while also achieving an increase in the QoS.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A method for allocating resources in a wireless communications system, the method comprising:
    operating a wireless station to transmit a request to send (RTS) message;
    operating a receiver to receive the RTS message and, in response, transmit an ask for request (AFR) message to be received by the wireless station which transmitted the RTS message, and by another wireless station, the AFR message including channel state information indicating to the wireless station and to the another wireless station communication resources that the receiver allocates to the wireless station so as to allow the another wireless station to evaluate communication resources that are still available to the another wireless station;
    operating the receiver to wait for receipt of another RTS message transmitted by the another wireless station which received the transmitted AFR message and, if the receiver receives the another RTS message, operating the receiver to transmit another AFR message including channel state information indicating to the another wireless station and to a further wireless station communication resources that the receiver allocates to the another wireless station and operating the receiver to wait for receipt of a further RTS message transmitted by the further wireless station, and if the receiver does not receive the another RTS message within a period of time, operating the receiver to transmit a clear to send (CTS) message; and
    operating the receiver to transmit a different another AFR message before transmitting the CTS message if the receiver does not receive the further RTS message within a period of time after receiving the another RTS message due to a collision that occurred while the receiver was waiting for the further RTS message.

2. A method as claimed in claim 1, further comprising:
    operating the receiver to transmit a further AFR message and wait for receipt of an additional RTS message if the receiver receives the further RTS message, and if the receiver does not receive the further RTS message within a period of time, operating the receiver to transmit a clear to send (CTS) message.

3. A method as claimed in claim 1, wherein:
    the receiver transmits the CTS message due to a message collision that occurred while the receiver was waiting for said another RTS message.

4. A method as claimed in claim 1, further comprising:
    operating the wireless station to transmit data in accordance with information contained in the AFR message upon receiving the AFR message.

5. A method as claimed in claim 1, wherein:
    wherein the AFR message includes information pertaining to a manner in which the wireless station is to transmit a frame for receipt by the receiver.

6. A method as claimed in claim 5, wherein:
    the information included in the AFR message comprises frame control information, frame duration information, receiver address information, channel state information and frame check sequence information.

7. A wireless communications system, comprising:
    a plurality of wireless stations and at least one receiver;
    wherein:
    one of the wireless stations transmits a request to send (RTS) message;
    the receiver receives the RTS message and, in response, transmits an ask for request (AFR) message to be received by the one of the wireless stations which transmitted the RTS message, and by another one of the wireless stations, the AFR message including channel state information indicating to the one of the wireless stations and to the another one of the wireless stations communication resources that the receiver allocates to the one of the wireless stations; and
    the receiver further operates to wait for receipt of another RTS message transmitted by the another one of the wireless stations which received the transmitted AFR message and, if the receiver receives the another RTS message, the receiver transmits another AFR message including channel state information indicating to the another one of the wireless stations and to a further one of the wireless stations communication resources that the receiver allocates to the another one of the wireless stations and the receiver waits for receipt of a further RTS message transmitted by the further one of the wireless stations, and if the receiver does not receive the another RTS message within a period of time, the receiver transmits a clear to send (CTS) message, the receiver transmits a different another AFR message before transmitting the CTS message if the receiver does not receive the further RTS message within a period of time after receiving the another RTS message due to a collision that occurred while the receiver was waiting for the further RTS message.

8. A system as claimed in claim 7, wherein:
the receiver transmits a further AFR message and waits for receipt of an additional RTS message if the receiver receives the further RTS message, and if the receiver does not receive the further RTS message within a period of time, the receiver transmits a clear to send (CTS) message.

9. A system as claimed in claim 7, wherein:
the receiver transmits the CTS message due to a message collision that occurred while the receiver was waiting for said another RTS message.

10. A system as claimed in claim 7, wherein:
the wireless station transmits data in accordance with information contained in the AFR message upon receiving the AFR message.

11. A system as claimed in claim 7, wherein:
wherein the AFR message includes information pertaining to a manner in which the wireless station is to transmit a frame for receipt by the receiver.

12. A system as claimed in claim 11, wherein:
the information included in the AFR message comprises frame control information, frame duration information, receiver address information, channel state information and frame check sequence information.

13. A method for operating a wireless receiver in a wireless communications system, the method comprising:
operating the receiver to receive an RTS message from at least one of a plurality of wireless stations and, in response, transmit an ask for request (AFR) message to be received by the one of the wireless stations which transmitted the RTS message, and by another one of the wireless stations, the AFR message including channel state information indicating to the one of the wireless stations and to the another one of the wireless stations communication resources that the receiver allocates to the one of the wireless stations; and
operating the receiver to wait for receipt of another RTS message transmitted by the another one of the wireless stations which received the transmitted AFR message and, if the receiver receives the another RTS message, operating the receiver to transmit another AFR message including channel state information indicating to the another one of the wireless stations and to a further one of the wireless stations communication resources that the receiver allocates to the another one of the wireless stations and operating the receiver to wait for receipt of a further RTS message transmitted by the further one of the wireless stations, and if the receiver does not receive the another RTS message within a period of time, operating the receiver to transmit a clear to send (CTS) message; and
operating the receiver to transmit a different another AFR message before transmitting the CTS message if the receiver does not receive the further RTS message within a period of time after receiving the another RTS message due to a collision that occurred while the receiver was waiting for the further RTS message.

14. The method as claimed in claim 13, further comprising:
operating the receiver to transmit a further AFR message and wait for receipt of an additional RTS message if the receiver receives the further RTS message, and if the receiver does not receive the further RTS message within a period of time, operating the receiver to transmit a clear to send (CTS) message.

15. A method for allocating resources in a wireless communications system, the method comprising:
operating a wireless station to transmit a request to send (RTS) message;
operating a receiver to receive the RTS message and, in response, transmit an ask for request (AFR) message to be received by the wireless station which transmitted the RTS message, and by another wireless station;
operating the receiver to wait for receipt of another RTS message transmitted by the another wireless station which received the transmitted AFR message and, if the receiver receives the another RTS message, operating the receiver to transmit another AFR message and wait for receipt of a further RTS message transmitted by a further wireless station, and if the receiver does not receive the another RTS message within a period of time, operating the receiver to transmit a clear to send (CTS) message; and
operating the receiver to transmit a different another AFR message before transmitting the CTS message if the receiver does not receive the further RTS message within a period of time after receiving the another RTS message due to a collision that occurred while the receiver was waiting for the further RTS message.

16. A wireless communications system, comprising:
a plurality of wireless stations and at least one receiver;
wherein:
one of the wireless stations transmits a request to send (RTS) message;
the receiver receives the RTS message and, in response, transmits an ask for request (AFR) message to be received by the one of the wireless stations which transmitted the RTS message, and by another one of the wireless stations; and
the receiver further operates to wait for receipt of another RTS message transmitted by the another one of the wireless stations which received the transmitted AFR message and, if the receiver receives the another RTS message, the receiver transmits another AFR message and waits for receipt of a further RTS message transmitted by a further one of the wireless stations, and if the receiver does not receive the another RTS message within a period of time, the receiver transmits a clear to send (CTS) message; and
the receiver transmits a different another AFR message before transmitting the CTS message if the receiver does not receive the further RTS message within a period of time after receiving the another RTS message due to a collision that occurred while the receiver was waiting for the further RTS message.

* * * * *